No. 766,067. PATENTED JULY 26, 1904.
M. W. SAYYIDAH.
COMBINATION TOOL FOR WATCH REPAIRING.
APPLICATION FILED APR. 30, 1904.
NO MODEL.
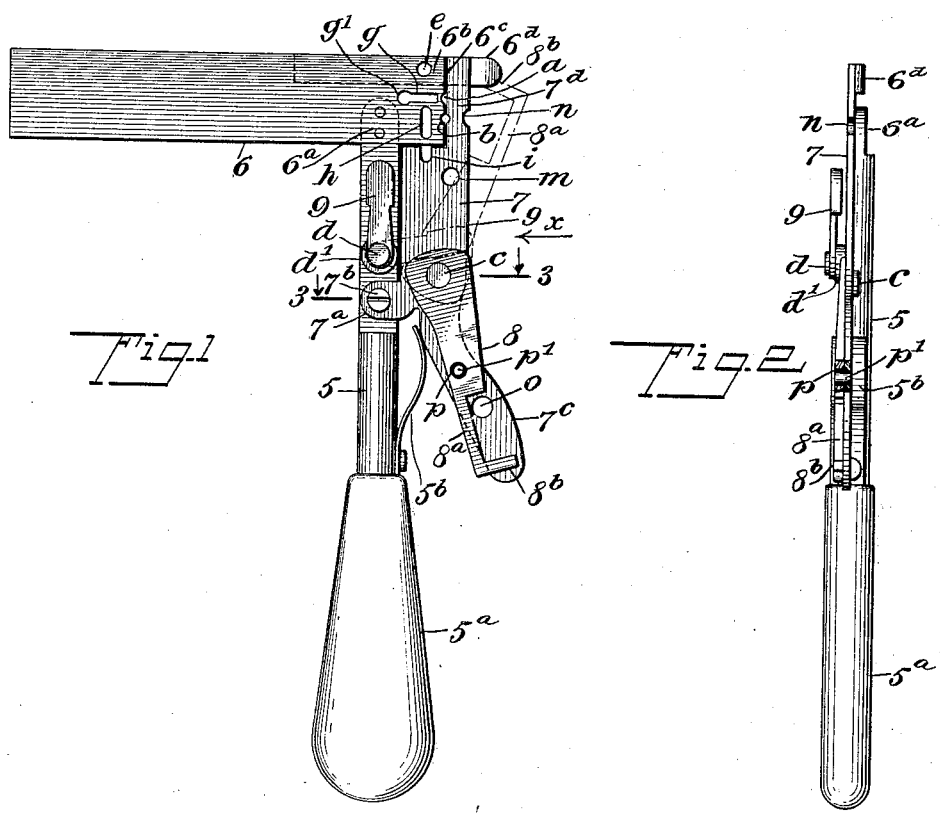
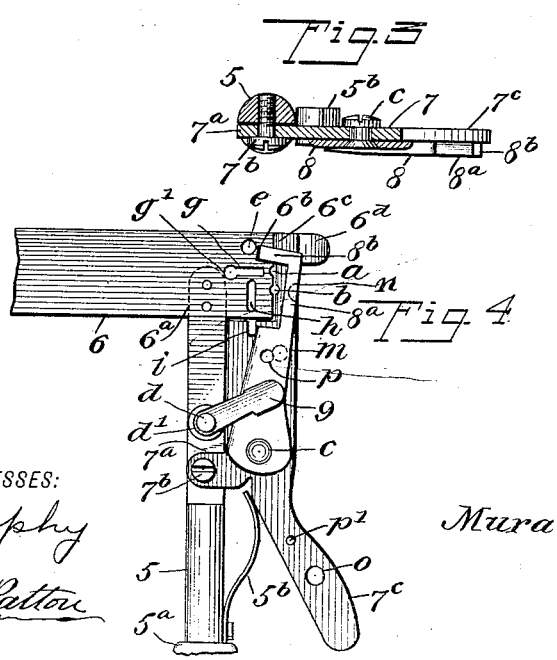
WITNESSES:
J. A. Brophy
Wm. P. Patton
INVENTOR
Murad W. Sayyidah
BY
ATTORNEYS No. 766,067. Patented July 26, 1904.

UNITED STATES PATENT OFFICE.

MURAD W. SAYYIDAH, OF DEEPRIVER, IOWA.

COMBINATION-TOOL FOR WATCH-REPAIRING.

SPECIFICATION forming part of Letters Patent No. 766,067, dated July 26, 1904.

Application filed April 30, 1904. Serial No. 205,661. (No model.)

*To all whom it may concern:*

Be it known that I, MURAD W. SAYYIDAH, a citizen of the United States, and a resident of Deepriver, in the county of Poweshiek and State of Iowa, have invented a new and Improved Combination-Tool for Watch-Repairing, of which the following is a full, clear, and exact description.

This invention has for its object to provide novel details of construction for a combination-tool which affords convenient and reliable means for the setting of roller-jewels in correct positions, and hold cannon-pinions and the hands, large and small, of watches when these are to be cleaned or repaired.

Furthermore, the implement may be employed to hold in position forks and levers of watch-movements for the cementing of jewels therein.

The invention consists in the novel construction and combination of parts, as is hereinafter described and claimed.

Reference is to be had to the accompanying drawings, forming a part of this specification, in which similar characters of reference indicate corresponding parts in all the figures.

Figure 1 is a side view of the improved tool, showing one adjustment of the movable parts thereof. Fig. 2 is an edge view of the same seen in direction of the arrow $x$ in Fig. 1. Fig. 3 is a transverse sectional view substantially on the line 3 3 in Fig. 1; and Fig. 4 is a side view of the tool, showing a different adjustment of parts from that shown in Fig. 1.

On a shank 5 of suitable length a handle $5^a$ is formed or secured at one end and a flat elongated holder-plate 6 affixed at the opposite end, preferably at a right angle to the shank, the point of attachment $6^a$ being near the right-hand end of the holder-plate, thus providing a short plate member $6^b$, that constitutes a clamping-head.

On the shank 5 near its center of length a main clamping-bar 7 is loosely secured. The bar 7 is in the form of a flat strip of metal, steel being preferred, said main clamping-bar having parallel edges. From a side edge of the clamping-bar 7 a hinge-leaf $7^a$ projects laterally in the same plane therewith and laps upon a flattened portion of the shank 5, whereon it is pivoted by means of a rivet or screw $7^b$. A handle-lever $7^c$ is integrally extended from the main clamping-bar 7 below the leaf $7^a$, and said lever trends diagonally downward and outward from its point of connection with the main clamping-bar.

A finger-spring $5^b$ is affixed by one end upon the shank 5 near the handle $5^a$ and extends upward and outward therefrom, having such curvature as adapts the upper portion thereof to press upon the adjacent edge of the handle-lever $7^c$, the stress of the spring normally holding the inner edge of the clamping-bar, that is below the holder-plate 6, in contact with the shank 5.

As shown, the clamping-head $6^b$ has its edge $6^c$, which is the free end of said holder-plate, disposed at right angle to the parallel elongated edges of said holder-plate, and opposite this edge $6^c$ the upper portion of the main clamping-bar 7 is notched in an adjacent edge, so as to receive the clamping-head, which fits into the notch and contacts at the lower edge and edge $6^c$ with like edges on the clamping-bar 7 when the latter is in folded condition, as shown in Figs. 1 and 4, the notch producing a clamping-limb $7^d$ on the bar 7. A strip of metal may be secured on the holder-plate above the shank 5 and at the rear side of said plate, one end of the strip projecting beyond the edge $6^c$ far enough to afford a rest and guide for the clamping-limb $7^d$ when it is rocked toward the edge $6^c$.

In the true edge $6^c$ two semicircular notches $a$ $b$ are formed that are spaced apart, the notch $b$ being opposed by a similar notch in the inner edge of the clamping-limb $7^d$. The notches $b$ afford convenient means for gripping the hub ends of seconds-hands, and thus holding such small hands while repairing them.

It will be observed that the spring $5^b$ normally presses the limb $7^d$ against the edge $6^c$, and the strength of said spring should be sufficient to clamp the limb $7^d$ upon the hubs of small hands and hold them in the notches $b$ while repairs are made to said hands.

The notch $a$ is designed to receive and, in conjunction with the straight edge of the clamping-limb $7^d$, hold the correspondingly-shaped end of a roller-jewel, that fits into a mating hole in a roller-table, the instrument affording convenient means for the insertion of the jewel in place, and the jewel may be firmly secured by coating its end with shellac-cement and then applying to the holder-plate 6, at a point near the opposite end of said plate, heat, such as the flame of an alcohol-lamp, which will harden the cement, and it is to be understood that the roller-table and hair-spring of the watch-movement need not be removed from the other details of the watch-movement when this operation is being conducted.

On the main clamping-bar 7 a flat jaw-plate 8 is pivoted by a rivet $c$ or the like, said pivot being centrally located in the clamping-bar and near one end of the jaw-plate.

An elongated rectangular notch is formed in one side edge of the jaw-plate 8 near its free end, affording a narrow clamping member $8^a$ and a finger-bar $8^b$ thereon, the latter, which is at the outer end of the notch, projecting at a right angle from the member $8^a$ and toward the holder-plate 6.

A keeper-arm 9 is pivoted near one of its ends upon the flat side of the shank 5, as shown at $d$, and has such length as adapts it to ride upon the jaw-plate 8 and hold it from rocking when said plate is adjusted to bear upon the main clamping-bar 7 at a desired point, and to facilitate this adjustment the arm 9 may be slightly raised from the shank 5 by an interposed washer $d'$.

A perforation $e$ is formed in the clamping-head $6^b$ near the edge $6^c$, this perforation being available for the insertion of a safety-pin, so that a lever of the watch-movement that is to receive a pallet-jewel may be placed flat on the holder-plate, and thus permit the jewel to be cemented with shellac and heat applied upon the outer end portion of the plate 6. It is also feasible to utilize the hole $e$ for the clamping of other details of the watch-movement while repairing them, and in this case the jaw-plate and keeper-arm 9 may be adjusted so that the finger-bar $8^b$ will press upon an object that is inserted in the hole $e$.

In the clamping-head $6^b$ below the perforation $e$ a narrow slot $g$ is formed, which extends longitudinally and terminates at the end nearest to the shank 5 in a circular enlargement $g'$. The slot $g$ and circular enlargement $g'$ are provided to receive and hold temporarily a balance-wheel roller for setting it in position on a roller-jewel clamped in the notch $a$ by the limb $7^d$ on the main clamping-bar 7, the tension of the spring $5^b$ serving to clamp the jewel and permit an engagement therewith of the balance-wheel roller and the cementing of these parts together with shellac and applied heat, as before explained.

In the upper edge of the main clamping-bar 7, that contacts with the lower edge of the clamping-head $6^b$, a notch $i$ is formed that receives a foot-pin when adjusting pallet-jewels. In the main clamping-bar 7 a circular hole $m$ of proper size is formed near its outer edge and in the path of the jaw-plate 8, this hole receiving cannon-pinions or the hub ends of watch-hands when these details of a watch are to be repaired or cleaned, the jaw-plate 8 and keeper-bar 9 serving to hold these parts temporarily secured in the perforation $m$.

In use if the jaw-plate 8 is turned so as to cause its finger-bar $8^b$ to ride over the guide-flange $6^d$ toward the perforation $e$ the finger-bar may be held in any desired position by means of the keeper-bar 9.

In the outer edge of the member $7^d$ of the clamping-bar 7 a notch $n$ is formed, which gives freedom for the downward passage of safety-pins that are employed in straight-line escapement-levers of various sizes when the adjusting and cementing of pallet-jewels therein is being effected.

In the handle-lever $7^e$ a perforation $o$ is formed, which is designed to receive the hubs of hour-hands or other watch-hands, which may be held firmly therein by turning the jaw-plate 8 so that its member $8^a$ may bear upon the hub of the hand and be held clamped in the perforation $o$ by means of the keeper-arm 9, this retention of the hands temporarily in the handle-lever affording means for cleaning or repairing the watch-hands.

In the jaw-plate 8 about midway between the finger-bar $8^b$ and pivot $c$ a perforation $p$ is formed, and from the handle-lever $7^e$ a small stud $p'$ is projected in the path of the perforation, so that by turning the jaw-plate down over the handle-lever the pin or stud $p'$ will enter the hole $p$ and secure the jaw-plate temporarily on the handle-lever, where it can remain until needed for use.

The means for fixing pallet-jewels in levers for straight-line escapements has been described. When it is necessary to adjust and set right and left hand escapement pallet-rollers to permit their adjustment and cementing on jewels held in the notch $a$, the operation is as follows: The fork of the lever is placed on the holder-plate 6 with its flat side down, the pallet-arbor then occupying the slot $h$ and the pallet-jewel located in the left-hand end of said slot for cementing. The end of the fork, either right or left hand, might be located so that the pin therein will pass down either through the perforation $e$ or the slot $i$.

The parts when in position as explained may be temporarily secured by means of the jaw-plate 8 and keeper-arm 9, if said parts are adjusted substantially as shown in Fig. 4, so that the jaw-plate or its members $8^a$ $8^b$ may either of them be held in enforced contact with a pin that occupies either the perforation or the slot $i$, whereupon the application of cement to the jewel and subsequent heating of the holder-plate 6 will fasten the jewel in place in the angle-escapement, that may be right or left handed, as before mentioned.

Having thus described my invention, I claim as new and desire to secure by Letters Patent—

1. An assembling instrument for watchmakers' use, comprising a handled shank, a flat holder-plate mounted on an end portion of the shank near one end of said holder-plate, the flat sides of the plate being parallel with the longitudinal axis of the shank, one end of the holder-plate forming a clamping-jaw, and a spring-pressed clamping-bar pivoted upon the shank, so as to work at one side nearly parallel therewith and opposite the clamping-jaw, the opposed edges of the clamping-jaw and holder-plate having registering notches therein, that receive and hold the hubs of watch-hands or watch-jewels for their proper disposal.

2. An assembling instrument for watchmakers' use, comprising a handled shank, a flat holder-plate mounted and secured upon one end of the shank in a plane parallel with the axis of the shank, a clamping-bar pivoted on the shank so as to rock in a plane nearly parallel therewith, a spring normally pressing the free end of the clamping-bar into contact with a true end of the holder-plate, a jaw-plate held to rock on the clamping-bar so as to dispose a clamping edge thereof toward and from the holder-plate and openings therein, and means for holding the jaw-plate stationary on the clamping-bar.

3. An assembling instrument for watchmakers' use, comprising a handled shank, a holder-plate on one end of the shank and at right angles thereto, one end of said plate forming a clamping-jaw, a main clamping-bar having a lateral joint-leaf that laps upon and is pivoted to the shank, said clamping-bar having a jaw opposing the jaw on the holder-plate, said plate near the jaw thereon having a perforation to receive pallet-pins of a watch-movement, a jaw-plate pivoted upon the clamping-bar and having a finger-bar on its free end that will cross this perforation in the holder-plate or clamp a pin therein, and means for holding the jaw-plate from rocking.

4. An assembling instrument for watchmakers' use, comprising a handled shank, an elongated holder-plate on one end of the shank and at a right angle thereto, a clamping-jaw on an end of the holder-plate, a main clamping-bar held to rock at one side of the shank, a resilient jaw-plate pivoted near one end on the clamping-bar, the holder-plate and main clamping-bar having a plurality of slots and notches therein, adapted to receive various parts of a watch-movement, toward which the jaw-plate may be rocked for engagement with any detail of watch mechanism inserted in one of the slots or notches, and a keeper-bar pivoted by one end on the shank and adapted for holding the jaw-plate at a desired point of rocking adjustment.

In testimony whereof I have signed my name to this specification in the presence of two subscribing witnesses.

MURAD W. SAYYIDAH.

Witnesses:
E. C. COCHRAN,
H. H. SANDERS.